J. L. CREVELING.
ELECTRIC REGULATION.
APPLICATION FILED SEPT. 29, 1911.
1,166,443. Patented Jan. 4, 1916.
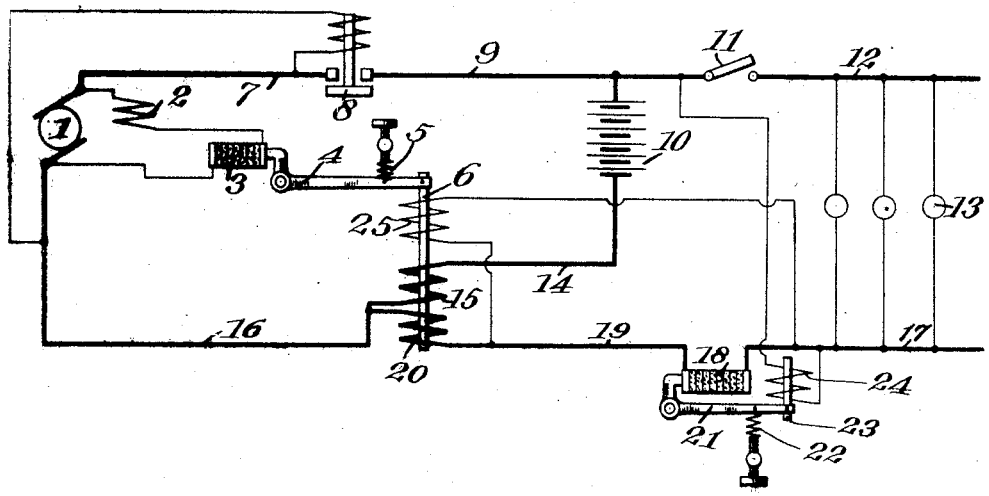
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,166,443.  Specification of Letters Patent.  Patented Jan. 4, 1916.

Application filed September 29, 1911. Serial No. 651,893.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to regulate a dynamo or generator in a predetermined manner and has for its particular object to provide means for automatically thus regulating a dynamo.

As my invention is particularly applicable to systems of electric distribution wherein a dynamo is used to charge a storage battery and furnish current to lamps or other translating devices, it will be described in connection with such a system.

The drawing is a diagrammatic representation of one type of system embodying the essentials of my invention.

In the drawing, 1 represents a dynamo or generator provided with the usual field coil 2 having in series therewith resistance 3 indicated as of the carbon pile variety, and it will be obvious that the dynamo may be regulated by proper manipulation of the resistance 3. The resistance 3 is controlled by the lever 4 normally drawn in an upward direction as by adjustable spring 5 in such manner as to tend to compress the carbon pile 3 and lower the resistance thereof. The lever 4 carries at one extremity a core of magnetic material 6 and thus motion imparted to said core may serve to regulate the generator.

7 represents the positive lead of the generator which is carried to one side of the switch 8 which is preferably of the automatic variety adapted to close the circuit when the voltage of the generator is substantially that of the battery and as many such switches are known in the art and the particular type of switch forms no part of my present invention the presence of one of the well known types is merely indicated diagrammatically. From the switch 8 the wire 9 is carried to one side of the switch 11 and is connected with the positive side of the storage battery 10, the negative side of which is connected as by wire 14 with one end of the solenoid 15 surrounding the core 6 and having its other terminal connected as by lead 16 to the negative brush of the generator. From the switch 11 the wire 12 is carried to one side of the lamps or other translating devices 13 having their negative terminals connected with the wire 17 which is carried to one side of a translation circuit regulator, in this instance indicated as a carbon pile 18, having its opposite terminal connected as by wire 19 with the coil 20, the opposite end of which is in connection with the lead 16. The coils 15 and 20 are so wound that if either be alone energized the same will tend to draw the core 6 downwardly against the action of spring 5 and increase the resistance 3, and so wound that current passing through the coil 15 when the battery is being charged will set up a magneto-motive force in the same direction as that set up by the coil 20 when the current is passing through coil 20 from the lamps or translating devices to the battery.

25 is a coil in shunt across the resistance 18 surrounding the core 6 in such manner that when energized it tends to set up a magneto-motive force in the same direction as the coil 15 when the generator is charging the battery. The carbon pile 18 is controlled by the lever 21 normally drawn in a downward direction as by spring 22 and provided at one extremity with the core 23 surrounded by a solenoid 24 in shunt across the translation circuit.

An operation of the herein shown system comprehending my invention is substantially as follows:—If the dynamo be running at such speed that the electro-motive force be sufficient to charge the storage battery the switch 8 will be closed and current will flow from the generator through lead 7, switch 8, wire 9, storage battery 10, wire 14, coil 15 and lead 16 to the generator, and I so adjust the spring 5 that when the desired maximum current is flowing through the battery and coil 15 any appreciable increase above this maximum current will cause the coil 15 to draw the core 6 downwardly against the action of spring 5 and increase the resistance 3 in such manner as to hold this desired maximum charging current from being exceeded. If, now, the lamp circuit be closed as by closing the switch 11, current will flow through switch 11, wire 12, translating devices 13, wire 17, resistance 18, wire 19 and coil 20 to the wire 16 and thence to the generator, and the coil 20 is wound in such manner that this current produces a magneto-motive force in the same direction as that produced by the coil 15 when traversed by the battery charging current, and it will thus be obvious that as the translation circuit load is increased less current will be necessary in the coil 15 to prevent the generator output from being exceeded. Therefore, the battery may be charged at the maximum current desired, and as load is thrown upon the translation circuit the current flowing in the coil 20 will lessen the current necessary in the coil 15 in such manner that a desired maximum output of the generator will not be exceeded even though heavy load be placed upon the same when the battery voltage is low. It will also be noted that, by proper proportioning of the coils 15 and 20, the generator output may be made to increase, as load is thrown upon the translating circuit, in a desired manner. That is to say, for example, two amperes increase in lamp load in coil 20 may cause 1 ampere less in the coil 15 and thus the generator output may be increased one-half the amount of lamp load thrown on, and further, with such proportioning of the coils the generator could never receive more than one hundred per cent. over load, even if the battery coil 15 were cut out altogether, and thus protection is afforded. If the voltage across the translating devices be in excess of that desired to have impressed upon the same, I so adjust the spring 22 that the coil 24 will raise the core 23 and lever 21 and increase the resistance 18 until the proper voltage is impressed upon the translation circuit, then any tendency to rise above this voltage will cause the resistance 18 to be increased and any fall in voltage will cause the resistance 18 to be decreased in such manner as to hold the voltage upon the translation circuit substantially constant. As the voltage across the translation circuit tends to rise and is held constant by increase of resistance 18 as above mentioned, the drop across the resistance 18 will increase and thus current in the coil 25 will increase, and as this current assists the coil 15 a lesser charging current will be necessary in the battery as the voltage across the same rises, since a rise in voltage across the battery causes a tendency to rise across the translation circuit and a corresponding increase in resistance 18. If the voltage of the generator be below that necessary to charge the battery, the main switch will be opened and current will be supplied by the battery to the translation devices and return through coil 20 and coil 15 to the battery, and it will be noted that the current passing through coil 20 is in the same direction as that passing through said coil when the generator was charging the battery. However, that passing through the coil 15 is opposed to the direction of the current flowing through the said coil when the battery was being charged. Therefore, the current passing from the battery to the lamps or translating devices through the two opposed coils will not increase the resistance 3 against the action of spring 5 even though the translation circuit load be quite in excess of the normal generator load, and thus any tendency to prevent the generator from picking up upon starting will be overcome in an obvious manner.

From the foregoing, it will be plain that I have produced a system wherein the generator is automatically controlled to charge a storage battery upon a constant current circuit. Also, that the output of the generator is automatically varied in a desired manner as current is supplied to the translation circuit and the said current regulation of the generator is affected by the operation of the translation circuit regulator by control of the current in the coil 20 and also by control of the current in the coil 25, the effect of the translation circuit regulator upon the coil 25 being to cut down the current supplied to the battery as the voltage across the battery rises due to charging.

I do not wish in any way to limit myself to the exact system set forth in this application merely to illustrate one type of system comprehending the essentials of my invention, for it will be obvious that wide departure may be made without departing from the spirit and scope of my invention which is as set forth in the following claims:

1. The combination with a generator, a storage battery, a translation circuit and a regulator for the translation circuit, of means for regulating the generator, means controlling said regulating means responsive to battery current fluctuations, means for controlling said regulating means responsive to translation circut current fluctuations, means for modifying the effect of the current responsive means affected by the operation of the translation circuit regulator.

2. The combination with a generator, a storage battery, a translation circuit and a regulator for the translation circuit, of a generator regulating means, means for operating the said regulating means responsive to battery current fluctuations, means for operating said regulating means responsive to translation circuit current fluctuations, and means for modifying the effect of the current responsive means affected by voltage variation upon the translation circuit.

3. The combination with a generator, a storage battery, a translation circuit and a regulator for the translation circuit, of a regulating element for controlling the generator, battery current responsive means for controlling said regulating element, translation circuit current responsive means for controlling said regulating element and means for adjusting the effect of the current responsive means affected by the operation of the translation circuit regulator.

4. The combination with a generator, a storage battery, a translation circuit and a regulator for the translation circuit, of a means for controlling the electro-motive force of said generator, means for operating said controlling means for preventing the battery current of said generator from exceeding a predetermined limit, means for operating said controlling means for preventing the translation circuit current supplied by said generator from exceeding a predetermined limit and means whereby the value of the current held from being exceeded by the current responsive means is adjusted by the operation of the translation circuit regulator.

5. The combination with a generator having a field winding, a storage battery, a translation circuit and a translation circuit regulator, of means for controlling the generator comprehending a variable resistance in circuit with the field winding, means for controlling said variable resistance responsive to battery current fluctuations, means for controlling said variable resistance responsive to translation circuit current fluctuations and means for modifying the effect of the current responsive means in response to operation of the translation circuit regulator.

6. The combination with a generator, a battery circuit and a translation circuit, of means for regulating the generator, means for operating the same responsive to current fluctuations in the battery circuit, means for affecting the regulating means responsive to current fluctuations in the translation circuit and means for modifying the current regulation of the generator affected by the voltage across the translation circuit.

7. The combination with a generator, a storage battery and a translation circuit, of a means for regulating the generator, means for controlling the regulating means to charge the battery upon a constant current circuit, means for controlling the regulating means in response to current changes in the translation circuit and means for adjusting the regulating means affected by the voltages across the translation circuit.

8. The combination with a generator, a storage battery and a translation circuit, of means for regulating the generator responsive to battery current fluctuations, means for controlling the regulating means responsive to translation circuit current fluctuations and means for adjusting the effect of the current responsive means responsive to fluctuations in voltage across the translation circuit.

9. The combination with a generator, a battery circuit and a translation circuit, of means for regulating the generator, means for controlling said means responsive to current fluctuations in the battery circuit and means for controlling said regulating means responsive to current in the translation circuit the joint effect of which is affected by voltage fluctuations in the translation circuit.

10. The combination with a generator, a storage battery and a translation circuit, of means for regulating the generator, responsive to battery current fluctuations, responsive to current changes in the translation circuit and responsive to voltage changes across the translation circuit.

11. The combination with a generator, a battery circuit and a translation circuit, of a means for regulating the generator responsive to battery current fluctuations and responsive to translation circuit current fluctuations comprising current responsive means in the battery circuit, means responsive to the translation circuit current, automatic means for regulating the translation circuit and means whereby the regulating drop thereof affects the current responsive means.

JOHN L. CREVELING.

Witnesses:
ANNA M. WALL,
M. HERSKOVITZ.

Copies of this patent may be obtained for five cents each, by addressing the "Commissioner of Patents, Washington, D. C."